United States Patent
Schwendeman et al.

(10) Patent No.: US 8,049,949 B2
(45) Date of Patent: Nov. 1, 2011

(54) MULTI-LAYER ELECTRODE FOR HIGH CONTRAST ELECTROCHROMIC DEVICES

(75) Inventors: Irina G. Schwendeman, Wexford, PA (US); James J. Finley, Pittsburgh, PA (US); Adam D. Polcyn, Pittsburgh, PA (US); Cheri M. Boykin, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 69 days.

(21) Appl. No.: 12/545,441

(22) Filed: Aug. 21, 2009

(65) Prior Publication Data

US 2010/0060971 A1 Mar. 11, 2010

Related U.S. Application Data

(60) Provisional application No. 61/092,758, filed on Aug. 29, 2008.

(51) Int. Cl.
*G02F 1/15* (2006.01)

(52) U.S. Cl. ........................................ 359/265

(58) Field of Classification Search .............. 359/265, 359/267, 273, 274, 275
See application file for complete search history.

(56) References Cited

U.S. PATENT DOCUMENTS

| | | |
|---|---|---|
| 4,610,771 A | 9/1986 | Gillery |
| 4,716,086 A | 12/1987 | Gillery et al. |
| 4,746,347 A | 5/1988 | Sensi |
| 4,792,536 A | 12/1988 | Pecoraro et al. |
| 4,806,220 A | 2/1989 | Finley |
| 4,834,857 A | 5/1989 | Gillery |
| 4,898,789 A | 2/1990 | Finley |
| 4,898,790 A | 2/1990 | Finley |
| 4,902,580 A | 2/1990 | Gillery |
| 4,948,677 A | 8/1990 | Gillery |
| 5,028,759 A | 7/1991 | Finley |
| 5,030,593 A | 7/1991 | Heithoff |
| 5,030,594 A | 7/1991 | Heithoff |
| 5,059,295 A | 10/1991 | Finley |
| 5,240,886 A | 8/1993 | Gulotta et al. |
| 5,385,872 A | 1/1995 | Gulotta et al. |

(Continued)

FOREIGN PATENT DOCUMENTS

JP          2005-91788       *   4/2005

OTHER PUBLICATIONS

JP 2005-91788 translation; Apr. 2005.*

*Primary Examiner* — Ricky Mack
*Assistant Examiner* — Tuyen Tra
(74) *Attorney, Agent, or Firm* — Andrew C. Siminerio

(57) ABSTRACT

An electrochromic device includes a first substrate spaced from a second substrate. A first transparent conductive electrode is formed over at least a portion of the first substrate. A polymeric anode is formed over at least a portion of the first conductive electrode. A second transparent conductive electrode is formed over at least a portion of the second substrate. In one aspect of the invention, a multi-layer polymeric cathode is formed over at least a portion of the second conductive electrode. In one non-limiting embodiment, the multi-layer cathode includes a first cathodically coloring polymer formed over at least a portion of the second conductive electrode and a second cathodically coloring polymer formed over at least a portion of the first cathodically coloring polymer. An ionic liquid is positioned between the anode and the cathode.

12 Claims, 1 Drawing Sheet

U.S. PATENT DOCUMENTS

| | | | |
|---|---|---|---|
| 5,393,593 A | 2/1995 | Gulotta et al. | |
| 5,821,001 A | 10/1998 | Arbab et al. | |
| 6,211,995 B1 * | 4/2001 | Azens et al. | 359/273 |
| 6,495,251 B1 | 12/2002 | Arbab et al. | |
| 6,667,825 B2 | 12/2003 | Lu et al. | |
| 6,828,062 B2 | 12/2004 | Lu et al. | |
| 7,256,923 B2 * | 8/2007 | Liu et al. | 359/265 |
| 2005/0141074 A1 * | 6/2005 | Chen | 359/265 |

* cited by examiner

MULTI-LAYER ELECTRODE FOR HIGH CONTRAST ELECTROCHROMIC DEVICES

CROSS-REFERENCE TO RELATED APPLICATION

This application claims the benefit of U.S. patent application Ser. No. 61/092,758, filed Aug. 29, 2008, which is herein incorporated by reference in its entirety.

This invention was made with Government support under contract number DE-FC26-06NT42763 awarded by the U.S. Department of Energy. The United States Government has certain rights in this invention.

BACKGROUND OF THE INVENTION

1. Field of the Invention

This invention relates generally to electrochromic devices and, in one particular embodiment, to an electrochromic device having at least one multi-layer electrochromic electrode.

2. Description of the Current Technology

Electrochromic devices are devices fabricated utilizing electrochromic materials that change color in a reversible manner as a result of the application of an electrical potential. These devices find applications in a wide range of areas, such as but not limited to architectural windows and vehicle transparencies.

Known electrochromic devices typically include two spaced substrates with an electrode formed on each substrate and a conductive liquid positioned between the electrodes. Recently, the use of conjugated polymers in an electrochromic device has been suggested. These polymers may provide advantages over the previous inorganic electrodes. However, in order for the electrochromic device to function in a commercially acceptable manner, the device must still have commercially acceptable levels of contrast and aesthetic appearance.

SUMMARY OF THE INVENTION

In one non-limiting aspect, an electrochromic device of the invention comprises a first substrate spaced from a second substrate. A first transparent conductive electrode is formed over at least a portion of the first glass substrate. A polymeric anode is formed over at least a portion of the first conductive electrode. A second transparent conductive electrode is formed over at least a portion of the second substrate. In one aspect of the invention, a multi-layer polymeric cathode is formed over at least a portion of the second conductive electrode. In one non-limiting embodiment, the multi-layer cathode comprises a first cathodically coloring polymer formed over at least a portion of the second conductive electrode and a second cathodically coloring polymer formed over at least a portion of the first cathodically coloring polymer. An ionic liquid is position between the polymeric anode and polymeric cathode.

The use of a multi-layer polymeric cathode provides certain advantages over known devices. For example, the first polymer formed over the second conductive electrode can be selected to provide excellent adhesion to the underlying substrate but may not provide the same level of contrast as the second polymer. The second polymer may have better contrast than the first polymer and may form a smoother film when applied to the first polymer than would occur if applied directly onto the substrate.

BRIEF DESCRIPTION OF THE DRAWINGS

The invention will be described with reference to the attached drawing figures wherein the reference numbers identify like parts throughout.

DESCRIPTION OF THE PREFERRED EMBODIMENTS

Figure 1:
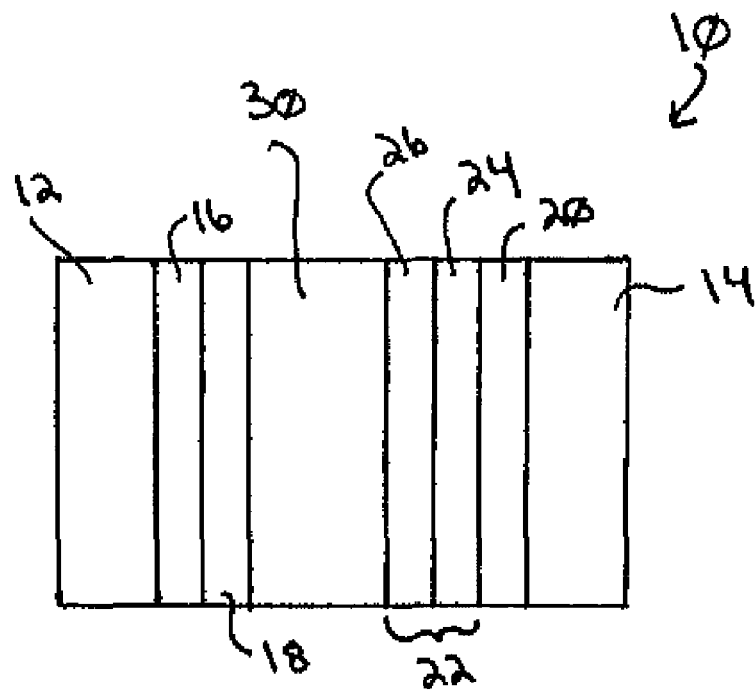
FIG. 1 is a side view (not to scale) of an electrochromic device incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as but not limited to, issued patents and patent applications, referred to herein are to be considered to be "incorporated by reference" in their entirety. As used herein, silicon is considered to be a "metal".

An electrochromic device 10 incorporating features of the invention is illustrated in FIG. 1. The device 10 includes a first substrate 12 spaced from a second substrate 14. A first transparent conductive member or electrode 16 is formed over at least a portion of the first glass substrate 12. A polymeric anode 18 is formed over at least a portion of the first conductive electrode 16. A second transparent conductive member or electrode 20 is formed over at least a portion of the second substrate 14. In one aspect of the invention, a multi-layer polymeric cathode 22 is formed over at least a portion of the second conductive electrode 20. The multi-layer cathode 22 comprises a first cathodically coloring polymer 24 formed over at least a portion of the second conductive electrode 20 and a second cathodically coloring polymer 26 formed over at least a portion of the first cathodically coloring polymer 24. An ionic liquid 30 is positioned between the polymeric anode and polymeric cathode.

The substrates 12 and 14 can be of any desired material. In the broad practice of the invention, the substrates 12, 14 can be of the same or different materials. The substrates 12, 14 can include any desired material having any desired characteristics. For example, one or more of the substrates 12, 14 can be transparent or translucent to visible light. By "transparent" is meant having visible light transmission of greater than 0% to 100%. Alternatively, one or more of the substrates 12, 14 can be translucent. By "translucent" is meant allowing electromagnetic energy (e.g., visible light) to pass through, but diffusing this energy such that objects on the side opposite the viewer are not clearly visible. Examples of suitable materials include, but are not limited to, plastic substrates (such as acrylic polymers, such as polyacrylates or stretched acrylic; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the substrates 12, 14 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. The first and second substrates 12, 14 can each be, for example, clear float glass or can be tinted or colored glass or one substrate 12, 14 can be clear glass and the other substrate 12, 14 colored glass. Although not limiting to the invention, examples of glass suitable for the invention are described in U.S. Pat. Nos. 4,746,347; 4,792,536; 5,030,593; 5,030,594; 5,240,886; 5,385,872; and 5,393,593. The first and second substrates 12, 14 can be of any desired dimensions, e.g., length, width, shape, or thickness. Non-limiting examples of glass that can be used for the practice of the invention include clear glass, Starphire®, Solargreen®, Solextra®, GL-20®, GL-35™, Solarbronze®, and Solargray® glass, all commercially available from PPG Industries inc. of Pittsburgh, Pa.

The first and second conductive electrodes 16, 20 can be the same or different from each other. Examples of materials useful for the invention include conductive metal strips or conductive coatings. For example, the conductive electrodes 16, 20 can be formed by any transparent conductive oxide or a multi-layer conductive structure such as metal oxide/metal/metal oxide coating. Examples of transparent conductive materials useful for the invention include, but are not limited to, oxides of silicon, aluminum, zirconium, tin, indium, or mixtures thereof; nitrides; carbides; or oxycarbides. For example, one or both of the conductive members 16, 20 can be indium tin oxide or fluorine doped tin oxide. Examples of multi-layer structures include coatings having one or more metallic films positioned between dielectric layers. Examples of suitable dielectric layers include metal or non-metal oxides, nitrides, oxynitrides, or mixtures thereof. The metallic film can be a noble metal, such as silver, gold, copper, or combinations or alloys thereof. Examples of such coatings include the Solarban® and Sungate® families of coatings commercially available from PPG Industries, Inc. Specific coatings useful for the invention include Solarban® 60, Solarban® 70 and Sungate® 100 coatings. Examples of suitable coatings are found, for example, but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440.

The polymeric anode 18 comprises an organic semi-conducting polymer that changes color, for example from dark to light, when oxidized, and from light to dark when reduced. Examples of conductive polymers include poly(acetylene)s, poly(pyrrole)s poly(thiophene)s, poly(aniline)s, poly(p-phenylene sulfide) and poly(para-phenylene vinylene)s (PPV). For example, the anode can be polyaniline (PANI), commercially available from Ormecon GmbH (Product D1020). The polymer can be applied by any conventional method, such as spin coating or spraying.

The polymeric cathode 22 comprises two or more layers of semi-conducting polymers. In one non-limiting embodiment, the first layer 24 is poly (3-octylthiophene-2,5-diyl) (POT), commercially available from Reike Metals, Inc. (Product 4003E). The second layer 26 comprises at least one of poly (3,4-(2',2'-dimethylpropylene)-dioxythiophene) (PMAF-15), commercially available from Aldrich Chemicals (Product 660523) or poly (2,3-dihydrothieno [3,4-b]-1,4 dioxin) (PEDOT). For example, the first layer 24 can have a thickness in the range of 50 nanometers (NM) to 1,000 nm, such as 100 nm to 500 nm. The second layer 26 can have a thickness in the range of 100 nm to 1 micron. The first layer 24 and second layer 26 can be applied by any conventional method. In one non-limiting embodiment, the first layer 24 is applied by spin coating and the second layer 26 is applied by electrodeposition. Examples of organic semi-conducting polymers are found in, but are not limited to, U.S. Pat. Nos. 6,667,825 and 6,828,062.

The ionic liquid 30 can be any conventional ionic liquid. Examples of ionic liquids useful in the practice of the invention include, but are not limited to, imidazolium, pyridinium, pyrrolidinium, phoshponium, and ammonium. Examples of ionic liquids are found in U.S. Pat. Nos. 6,667,825 and 6,828,062. In one particular embodiment, the ionic liquid 24 can be [BMIM] $PF_6$ (1-butyl-3-methylimidazolium hexaflourophosphate) or [BMIM] $PF_4$(1-butyl-3-methylimidazolium tetraflourophosphate). The ionic liquid 24 can include nanoparticles to improve the uniformity and contrast of the electrochromic device 10 of the invention over conventional electrochromic devices. The nanoparticles can be produced by sputter-depositing the material in the ionic liquid 30. Examples of nanoparticles useful for the invention include, but are not limited to, tungsten oxide nanoparticles and/or zinc oxide nanoparticles.

Figure 2:
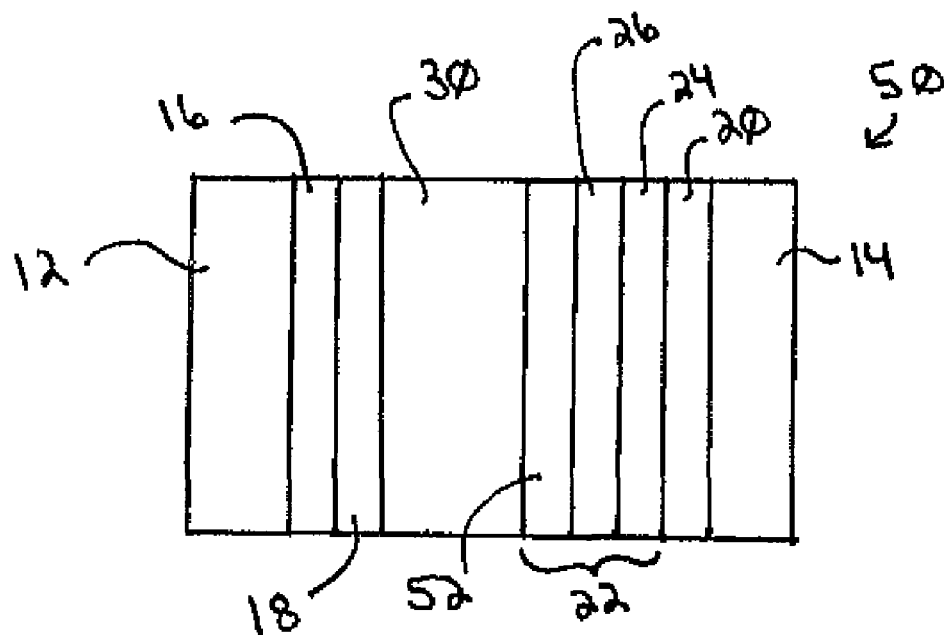
FIG. 2 is a side view (not to scale) of another electrochromic device incorporating features of the invention.

Another electrochromic device 50 is shown in FIG. 2. This device 50 is similar to the device 10 described above, but in this embodiment the polymeric cathode 22 comprises at least three layers of semi-conducting polymers. In one non-limiting embodiment, the first layer 24 is poly(3-octylthiophene-2,5-diyl) (POT), commercially available from Reike Metals, Inc. (Product 4003E). The second layer 26 is poly(2,3-dihydrothieno [3,4-b]-1,4 dioxin) (PEDOT). And the third layer 52 is poly(3,4-(2',2'-dimethylpropylene)-dioxythiophene) (PMAF-15), commercially available from Aldrich Chemicals (Product 660523).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An electrochromic device, comprising:
a first substrate spaced from a second substrate;
a first transparent conductive electrode formed over at least a portion of the first substrate;
a polymeric anode formed over at least a portion of the first conductive electrode, said polymeric anode comprising polyaniline;
a second transparent conductive electrode formed over at least a portion of the second substrate;
a multi-layer polymeric cathode formed over at least a portion of the second conductive electrode; and
an ionic liquid positioned between the anode and the cathode.

2. The device of claim 1, wherein the first and/or second conductive electrodes are selected from indium tin oxide or fluorine doped tin oxide.

3. The device of claim 1, wherein the polymeric cathode comprises a first cathodic polymer formed over at least a portion of the second conductive electrode and comprising poly(3-octylthiophene-2,5-diyl) and a second cathodic polymer formed over at least a portion of the first cathode polymer and comprising at least one of poly(3,4-(2',2'-dimethylpropylene)-dioxythiophene) or poly(2,3-dihydrothieno[3,4-b]-1,4 dioxin).

4. The device of claim 3, wherein the first cathodic polymer has a thickness in the range of 100 nm to 500 nm.

5. The device of claim 3, wherein the second cathodic polymer has a thickness in the range of 100 nm to 1 micron.

6. The device of claim 1, wherein the multi-layer cathode comprises a first cathodic polymer layer comprising poly(3-octylthiophene-2,5-diyl), a second cathodic polymer layer comprising poly(2,3-dihydrothieno[3,4-b]-1,4 dioxin) and a third cathodic polymer layer comprising poly(3,4-(2',2'-dimethylpropylene)-dioxythiophene).

7. An electrochromic device, comprising:
a first glass substrate spaced from a second glass substrate;
a first transparent conductive electrode formed over at least a portion of the first substrate, the first electrode selected from the group consisting of indium tin oxide and fluorine doped tin oxide;
a polymeric anode formed over at least a portion of the first conductive electrode, wherein the polymeric anode comprises polyaniline;
a second transparent conductive electrode formed over at least a portion of the second substrate, the second electrode selected from the group consisting of indium tin oxide and fluorine doped tin oxide;
a multi-layer polymeric cathode formed over at least a portion of the second conductive electrode, wherein the polymeric cathode comprises a first cathodic polymer formed over at least a portion of the second conductive electrode and comprising poly(3-octylthiophene-2,5-diyl) and a second cathodic polymer formed over at least a portion of the first cathode polymer and comprising at least one of poly(3,4-(2',2'-dimethylpropylene)-dioxythiophene) or poly(2,3-dihydrothieno [3,4-b]-1,4 dioxin); and
an ionic liquid positioned between the anode and the cathode.

8. The device of claim 7, wherein the multi-layer cathode comprises a first cathodic polymer layer comprising poly(3-octylthiophene-2,5-diyl), a second cathodic polymer layer comprising poly(2,3-dihydrothieno[3,4-b]-1,4 dioxin) and a third cathodic polymer layer comprising poly(3,4-(2',2'-dimethylpropylene)-dioxythiophene).

9. An electrochromic device, comprising:
a first substrate spaced from a second substrate;
a first transparent conductive electrode formed over at least a portion of the first substrate;
a polymeric anode formed over at least a portion of the first conductive electrode;
a second transparent conductive electrode formed over at least a portion of the second substrate;
a multi-layer polymeric cathode formed over at least a portion of the second conductive electrode; and
an ionic liquid positioned between the anode and the cathode,
wherein said multi-layer polymeric cathode comprises,
a first cathodic polymer formed over at least a portion of the second conductive electrode and comprising poly(3-octylthiophene-2,5-diyl), and
a second cathodic polymer formed over at least a portion of the first cathode polymer and comprising at least one of poly(3,4-(2',2'-dimethylpropylene)-dioxythiophene) or poly(2,3-dihydrothieno[3,4-b]-1,4-dioxin).

10. The device of claim 9, wherein the first cathodic polymer has a thickness in the range of 100 nm to 500 nm.

11. The device of claim 9, wherein the second cathodic polymer has a thickness in the range of 100 nm to 1 micron.

12. An electrochromic device, comprising:
a first substrate spaced from a second substrate;
a first transparent conductive electrode formed over at least a portion of the first substrate;
a polymeric anode formed over at least a portion of the first conductive electrode;
a second transparent conductive electrode formed over at least a portion of the second substrate;
a multi-layer polymeric cathode formed over at least a portion of the second conductive electrode; and
an ionic liquid positioned between the anode and the cathode,
wherein said multi-layer cathode comprises,
a first cathodic polymer layer comprising poly(3-octylthiophene-2,5-diyl),
a second cathodic polymer layer comprising poly(2,3-dihydrothieno [3,4-b]-1,4-dioxin), and
a third cathodic polymer layer comprising poly(3,4-(2',2'-dimethylpropylene)-dioxythiophene).

* * * * *